(12) United States Patent
Nellen (10) Patent No.: US 7,828,376 B2
(45) Date of Patent: Nov. 9, 2010

(54) OPEN ROOF CONSTRUCTION FOR A VEHICLE

(75) Inventor: Marcel Johan Christiaan Nellen, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 15 days.

(21) Appl. No.: 12/350,013

(22) Filed: Jan. 7, 2009

(65) Prior Publication Data

US 2009/0179462 A1 Jul. 16, 2009

(30) Foreign Application Priority Data

Jan. 10, 2008 (EP) ................................. 08100338

(51) Int. Cl.
*B60J 7/043* (2006.01)
(52) U.S. Cl. .................................. 296/216.03; 296/223
(58) Field of Classification Search ................................
296/216.02–216.05, 223
See application file for complete search history.

(56) References Cited

U.S. PATENT DOCUMENTS

| | | | |
|---|---|---|---|
| 4,650,243 A | 3/1987 | Hanley | |
| 4,679,846 A | 7/1987 | Lux | |
| 4,699,421 A | 10/1987 | Schaetzler | |
| 4,741,573 A | 5/1988 | Yokota | |
| 4,923,246 A | 5/1990 | Takahashi | |
| 4,978,165 A | 12/1990 | Schreiter | |
| 4,995,665 A | 2/1991 | Ichinose | |
| 5,026,113 A | 6/1991 | DiCarlo | |
| 5,447,355 A | 9/1995 | Kelm | |
| 5,464,267 A * | 11/1995 | Racine et al. | .......... 296/216.03 |
| 5,707,102 A | 1/1998 | Takahashi | |
| 6,416,122 B1 | 7/2002 | Schwarz et al. | |

(Continued)

FOREIGN PATENT DOCUMENTS

DE 3802380 A1 8/1988

(Continued)

OTHER PUBLICATIONS

European Search Report from EP08100338, May 2008.

*Primary Examiner*—Dennis H Pedder
(74) *Attorney, Agent, or Firm*—Steven M. Koehler; Westman, Champlin & Kelly, P.A.

(57) ABSTRACT

An open roof construction for a vehicle having a roof opening defined in a roof part of the vehicle includes a roof assembly having at least one panel that is movable between a closed position in which it closes the roof opening and an open position in which it opens the roof opening and is positioned at least partially above an adjoining roof part. A first device moves the rear edge of the panel towards a raised position relative to the closed position and above the adjoining roof part. A second device includes a lever for moving the front edge of the panel in a vertical direction. The lever has a lower pivoting axis, an upper pivotal connection to the panel and an intermediate guide connection, connecting the lever to a guiding slide. A guide mechanism is provided for guiding the panel towards the open position when the rear edge thereof is in the raised position. The lever of the second device is arranged such that the guide connection is closer to the upper pivotal connection than to the lower pivoting axis.

16 Claims, 8 Drawing Sheets

U.S. PATENT DOCUMENTS

| | | |
|---|---|---|
| 6,652,022 B2 | 11/2003 | Pfalzgraf |
| 6,805,402 B2 | 10/2004 | Pfalzgraf |
| 7,178,862 B2 * | 2/2007 | Oechel .................. 296/216.02 |
| 2002/0145310 A1 | 10/2002 | Pfalzgraf |
| 2002/0163227 A1 | 11/2002 | Pfalzgraf et al. |
| 2005/0231007 A1 | 10/2005 | Oechel |
| 2009/0179462 A1 | 7/2009 | Nellen |

FOREIGN PATENT DOCUMENTS

| | | |
|---|---|---|
| DE | 9302762 | 4/1993 |
| DE | 19713347 C1 | 5/1999 |
| DE | 102004018461 | 4/2004 |
| DE | 10348545 A1 | 5/2005 |
| DE | 102005007031 A1 | 8/2006 |
| EP | 0381066 | 8/1990 |
| EP | 2078630 | 1/2008 |
| EP | 2008100338.6 | 1/2008 |
| FR | 2726512 | 5/1996 |
| KR | 92-008091 | 9/1992 |
| NL | 1014023 | 1/2000 |
| WO | WO 2006086955 | 2/2006 |
| WO | WO 2007079747 | 7/2007 |

* cited by examiner

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to a roof assembly and an open roof construction for a vehicle having the roof assembly disposed in a roof opening defined in a roof part of the vehicle.

One form of roof assembly includes at least a panel which is movable between a closed position in which it closes the roof opening and an open position in which it opens the roof opening and is positioned at least partially above an adjoining roof part. A first device moves the rear edge of the panel towards a raised position relative to the closed position and above the adjoining roof part. A second device includes a lever and moves the front edge of the panel in vertical direction. The lever has a lower pivoting axis, an upper pivotal connection to the panel and an intermediate guide connection, connecting the lever to a guiding slide. A guide mechanism is provided for guiding the panel towards the open position when the rear edge thereof is in the raised position.

Such open roof constructions are for example known from U.S. Pat. No. 7,178,862 B2 and KR 92-008091.

Nowadays, the automobile industry requires higher standards every year, for example in the area of sound or noise insulation. In an open roof construction, one source of noise may be the sealing between the panel and the fixed roof part. If the panel is lifted from a seal when the vehicle is driving at high speeds with the roof panel closed, disturbing noises may be created and/or environmental noises may reach the interior of the vehicle. Due to larger roof panels and higher speeds obtainable by the vehicles, it becomes more and more important to provide a stable support for the panel so that it can withstand high forces and is able to keep the panel in a sealed engagement in the closed position.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

As an aspect of the present invention, the roof assembly or the open roof construction includes an arrangement of the lever of the second device such that the guide connection is closer to the upper pivotal connection than to the lower pivoting axis.

Due to this arrangement, the leverage of the lever is reduced and the lever is better equipped to prevent movements of the upper pivotal connection to the panel when the intermediate guide connection is stabilized.

According to one embodiment, the guide mechanism includes a stationary guide curve having a rear part extending substantially parallel to the panel when the panel is in the closed position, and a front part extending substantially perpendicularly to the rear part, the stationary guide being in slidable engagement with a guide member connected to the panel.

Due to this arrangement of the stationary guide, the lever of the second device and therefore the panel is locked in a very stable manner, because forces exerted from the panel in a sliding direction cannot cause any horizontal nor vertical movement of the lever.

The stability is further improved if the guide member is arranged on the lever of the second device, and in one embodiment, near the intermediate guide connection, in particularly closer to the intermediate connection than to the panel connection.

It is favorable if both the lower pivoting axis and the intermediate guide connection of the lever of the second device are in slidable engagement with the guiding slide, such that the lever of the second device is sliding with respect to the guiding slide when the guide member of the panel is positioned in the front part of the stationary guide and is substantially locked with respect to the guiding slide when the guide member is positioned in the rear part of the stationary guide.

In this embodiment the intermediate guide connection is locked in a stable position when the front of the panel is in its completely raised position.

Further details and advantages of aspects of the invention will become more clear from the following description of an embodiment of the invention with reference to the drawings.

DETAILED DESCRIPTION

Figure 1:
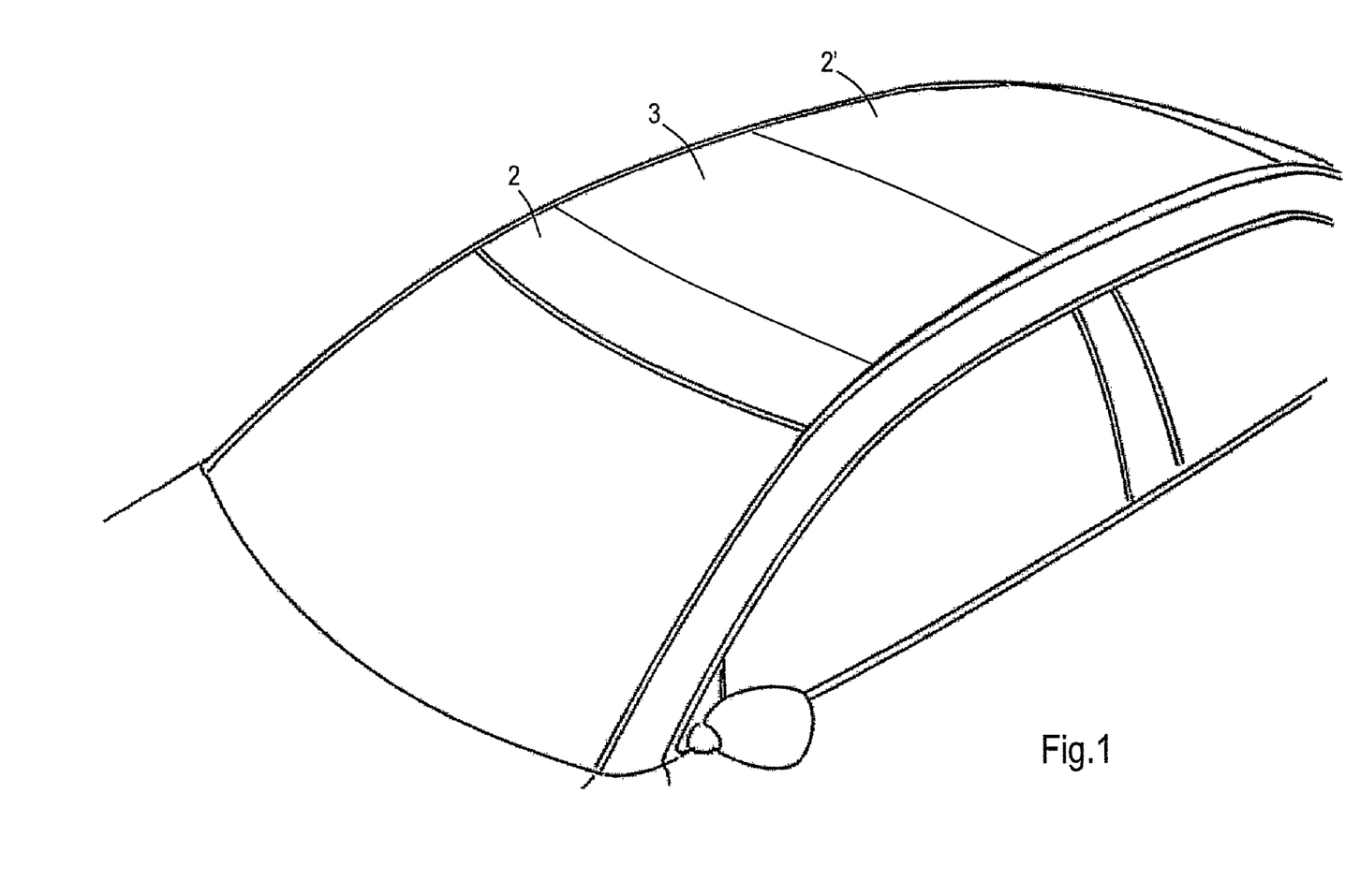
FIG. 1 is a schematic perspective view of a part of a vehicle with an embodiment of the open roof construction in a closed position.

FIG. 1 shows part of a vehicle which comprises a roof assembly 24 for opening and closing a roof opening 1 (FIG. 2) defined in a (stationary) roof part 2. The roof assembly 24 includes a panel 3 that is movable between a closed position (FIG. 1) in which it closes the roof opening 1, and an open position (FIG. 2) in which it opens the roof opening 1 and is positioned at least partially above the roof part 2.

As is known per se such an open roof construction (which is also known as a top slider roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof opening 3 is formed by a roof panel 2' which may be a stationary roof panel or a movable panel.

Figure 2:
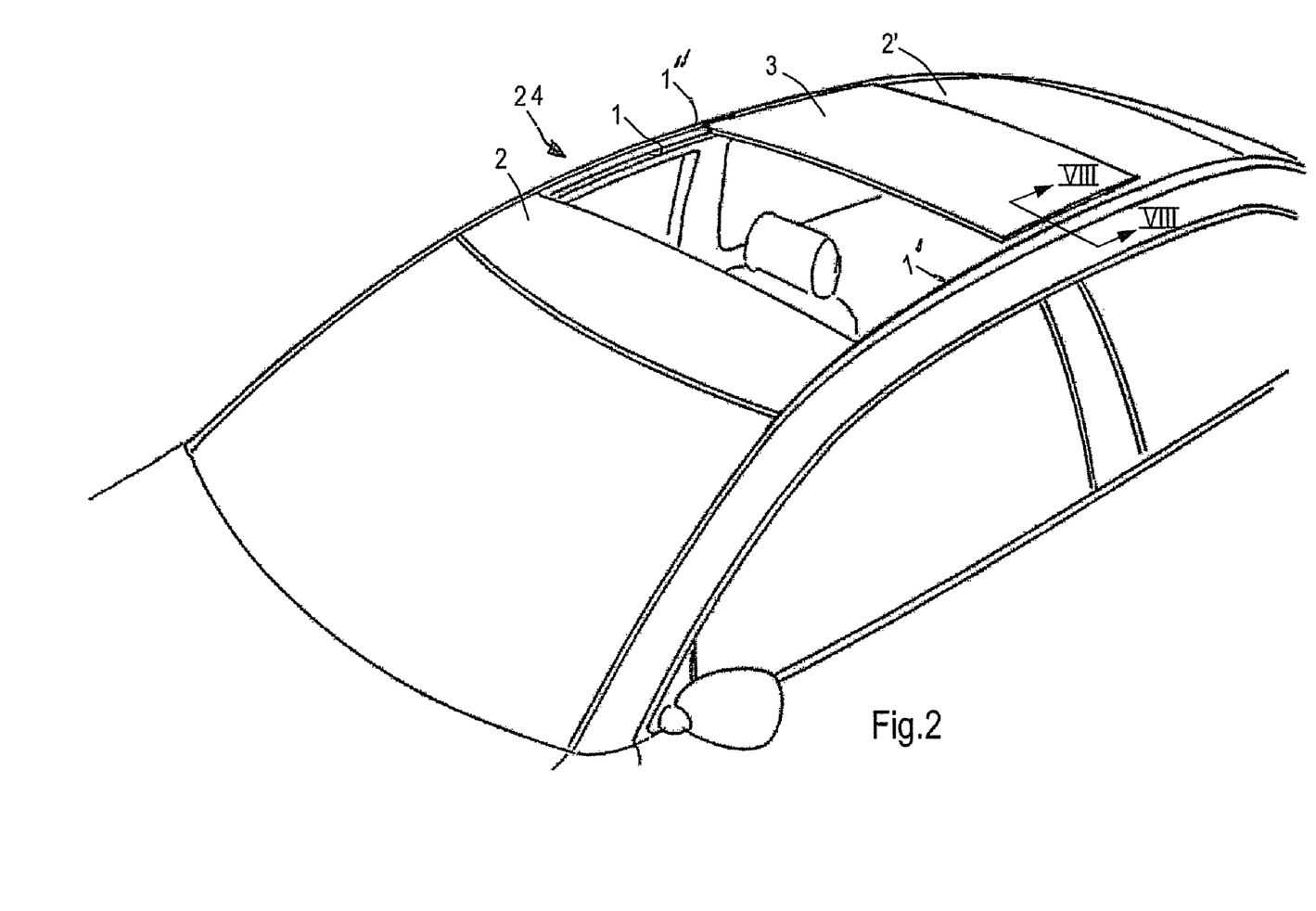
FIG. 2 is a view corresponding to that of FIG. 1 but showing a panel of the open roof construction in an open position.
Figure 3:
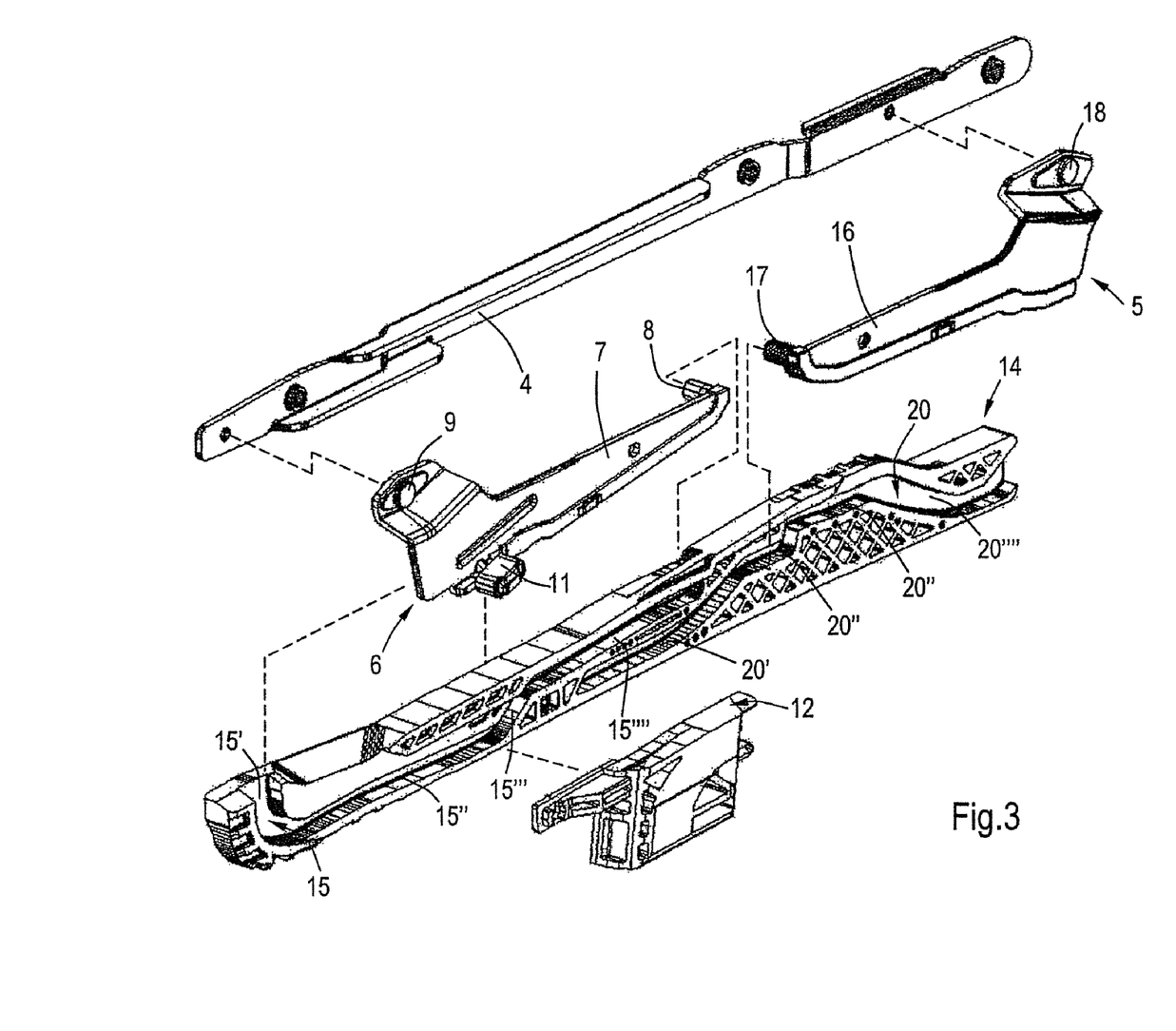
FIG. 3 is an enlarged exploded view of the parts of the operating mechanism of the open roof construction of FIGS. 1 and 2.
Figure 4:
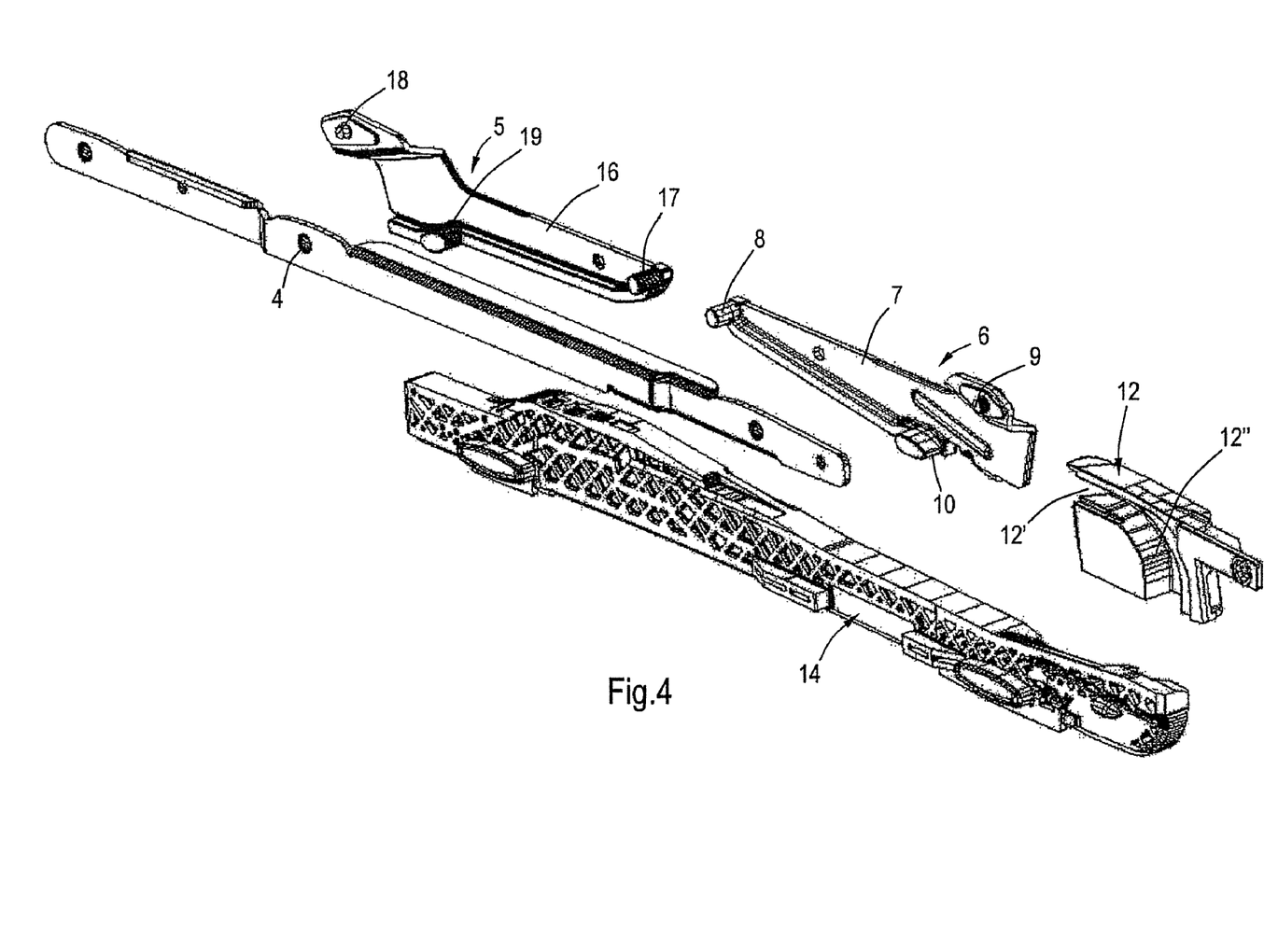
FIG. 4 shows the parts of FIG. 3 from the other side.
Figure 5:
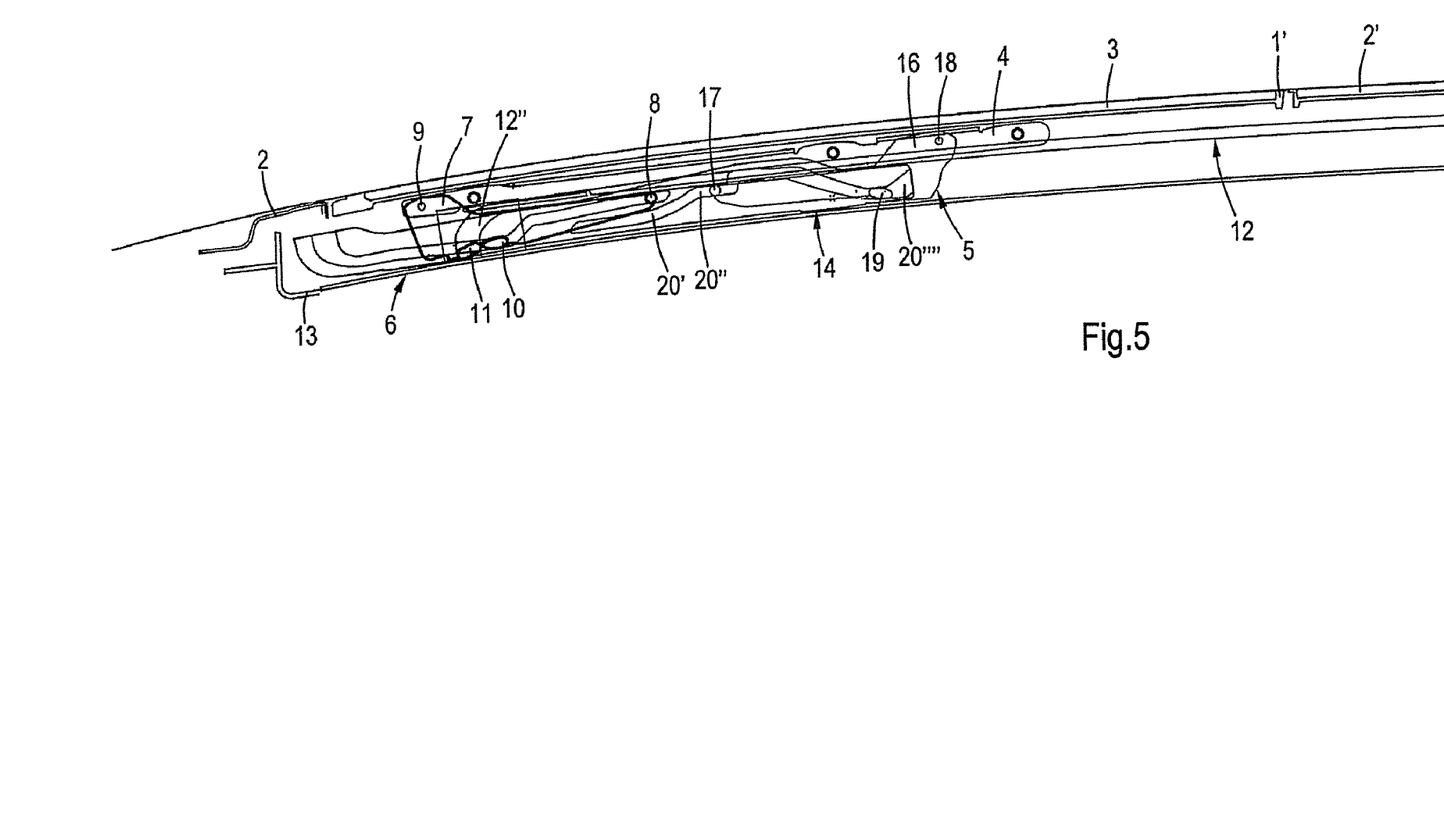
FIG. 5-7 are longitudinal sectional views of the open roof construction of FIGS. 1 and 2, in three different positions.
Figure 6:
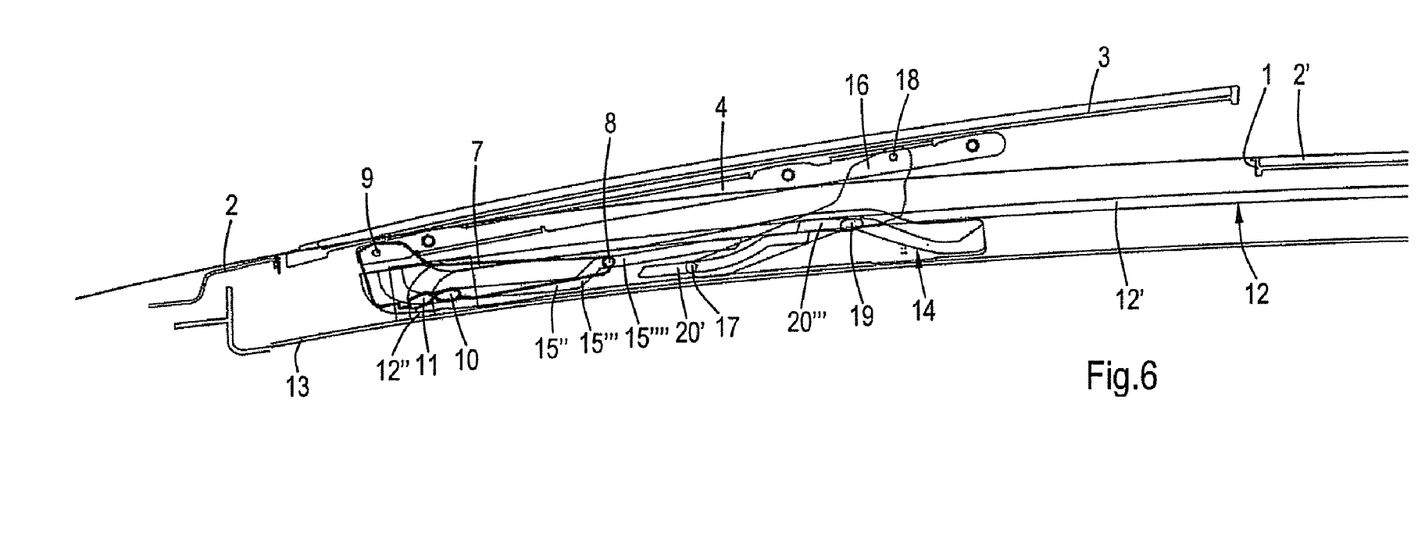
Figure 7:
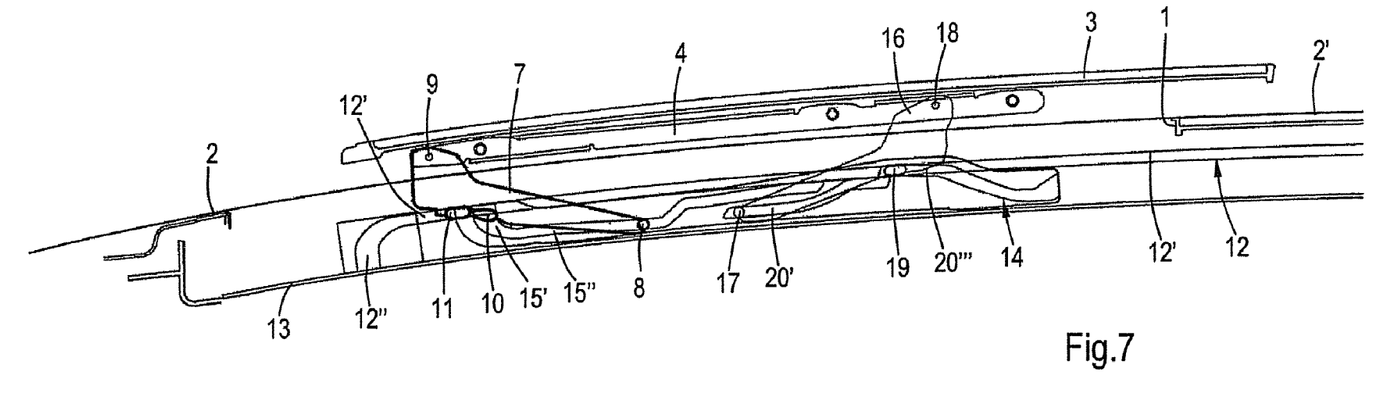

The movement of the panel 3 from the closed position as illustrated in FIG. 1 towards an open position as illustrated in FIG. 2 is governed by an operating mechanism of the roof assembly 24, the parts of which have been illustrated in FIGS. 3 and 4 and the operation of which is illustrated schematically in FIGS. 5-7. It is noted that FIGS. 3-7 represent an operating mechanism on one longitudinal side 1' of the roof opening 1, i.e. one longitudinal side of the panel 3, and it should be understood that a corresponding operating mechanism normally will be provided at the opposite longitudinal side 1", generally in mirror image.

Figure 8:
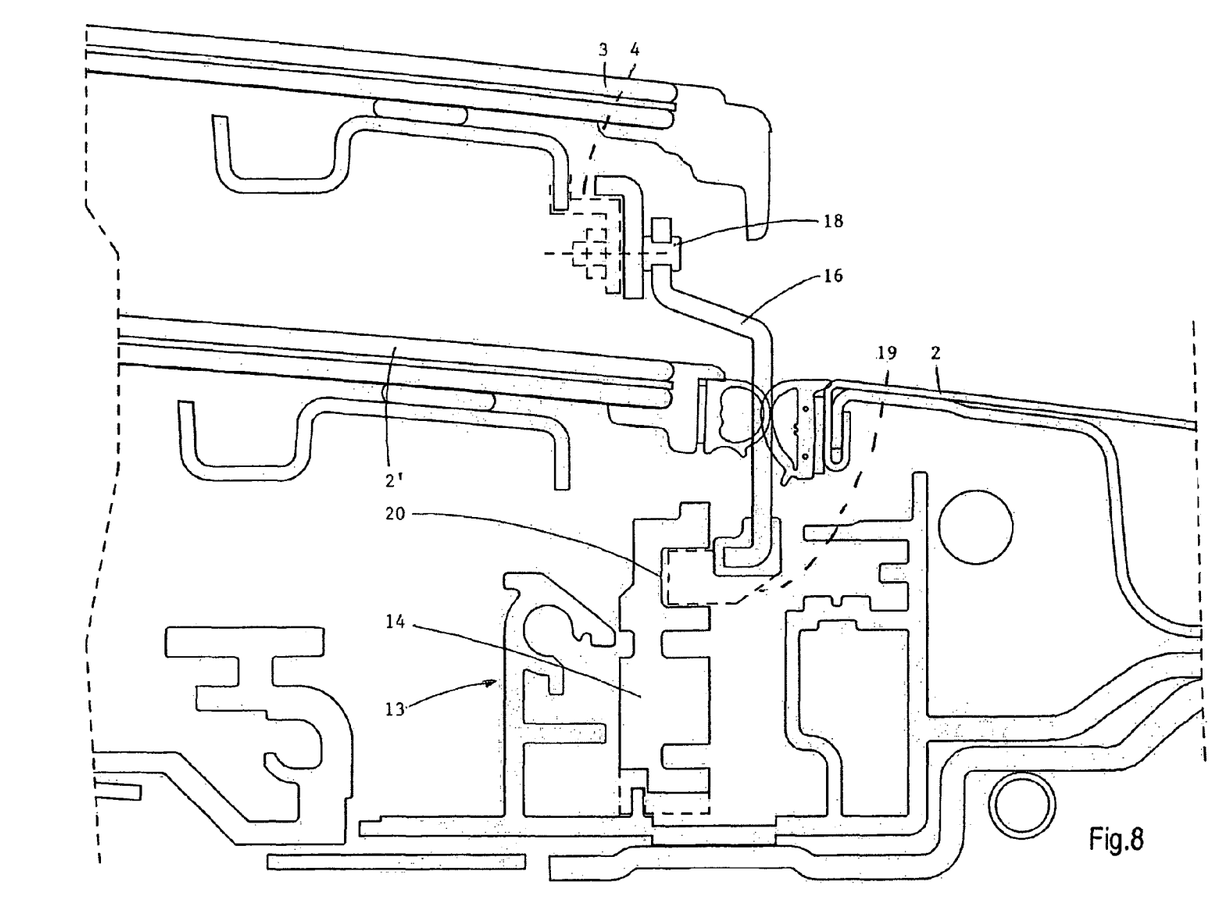
FIG. 8 is an enlarged cross-sectional view along the line VIII-VIII in FIG. 2.

FIGS. 3 and 4 show the parts of one of the operating mechanisms. The mechanism is connected to the panel 3 through a panel bracket 4 which is fixed to the lower side of the panel 3 near the longitudinal edge thereof in any known manner, for example through encapsulation or through attachment to another encapsulated part (see FIG. 8). The operating mechanism includes a first or rear device 5 and a front or second device 6.

The front or second device 6 includes a lever 7. In this document, "lever" is used to indicate an element which has a pivoting axis near both operative ends and has a length measured between these pivoting axes which is substantially larger than an effective width and thickness measured perpendicularly thereto. Any guide connection is positioned between these pivoting axes, as seen lengthwise. The lever 7 comprises a lower pivoting axis, here a pivot pin 8, an upper pivotal connection 9, pivotally connecting the lever 7 to the panel bracket 4 of the panel 3, and an intermediate guide connection 10, here in the form of a cam. In the vicinity of the intermediate guide connection 10, but on the other side of the lever 7, i.e. on the side opposite to the parts 8, 9 and 10, there is arranged a guide member 11 in the form of a guide cam. This guide member 11 is adapted to be in sliding engagement with a stationary guide curve 12. The stationary guide curve 12 includes a rear portion 12' extending substantially parallel to panel 3 when in the closed position, and in front portion 12" extending substantially perpendicularly to the rear portion 12'. As the guide member 11 has a substantially oval shape, the height of the guide curve 12 varies along its length depending on orientation of the guide curve 12, but also on the projected orientation of the lever 7 and the variation of this orientation of the lever 7 along the length of the guide curve 12.

In FIGS. 3 and 4 it is shown that the front portion 12" of the stationary guide curve 12 is made in a plastic part which is attached to a stationary guide rail 13 (see FIG. 5) which is attached to the vehicle roof 2, either directly or through a frame. The main part of the rear portion 12' of the stationary guide curve 12 will generally be formed by flanges 13' of the stationary guide rail 13 (see FIG. 8). The stationary guide curve 12 locks the horizontal movement of the panel 3 when it is in its forward position (through portion 12"), and locks the vertical movements of the panel 3 when the panel 3 is in the rearward position (through portion 12').

The pivot pin 8 and the intermediate guide connection 10 co-operate with a guiding slide 14 which will generally be connected directly to a driving mechanism, for example an electric motor or hand crank driving a push and pull cable (not shown) and therefore also acts as a driving slide. The guiding slide 14 is slidably guided in the stationary guide rail 13 and determines the movements of the panel 3. The guiding slide 14 includes a front guide curve, here a guide slot, 15 in which the pivot pin 8 and the cam of the intermediate guide connection 10 slidably engages. Although the pivot pin 8 and the cam 10 could have their own guide curve in the guiding slide 14, the structure can be simplified by sliding them in a single guide curve, in which the guide paths of pin 8 and cam 10 may slightly overlap, as shown. The front guide curve 15 includes a substantially vertical front locking portion 15', a lower front portion 15", an inclined intermediate portion 15'" and a higher rear portion 15"". Stated in other way with reference to movement of the panel 3 from the open position to the closed position, which herein is movement in a first direction, the guiding slide 14 includes a first guide curve (15'" and 15"") co-operating with the lower pivoting axis 8 of the lever 7 and a second guide curve (15" and 15') co-operating with the intermediate guide connection 10 of the lever 7, where the first guide curve (15'" and 15"") extends forwardly and downwardly in the first direction, the second guide curve (15" and 15') extends forwardly and upwardly in the first direction. The extent of the front guide curve 15 determines the vertical movements of the front edge of the panel 3.

The first or rear device 5 of the operating mechanism includes a lever 16. This lever 16 comprises a lower pivoting axis or pivot pin 17, an upper pivotal connection 18 and an intermediate guide connection 19. Both levers 7 and 16 extend in opposite directions, that is the front lever 7 extends from its connection to the panel 3 backwardly and downwardly, whereas the rear lever 16 extends forwardly and downwardly from the panel 3. As a result, both levers can be controlled be the same guiding slide 14 having a relatively short length, whereas the levers 7 and 16 connect to the panel 3 at a position near the front or rear edge respectively. This close connection to the front and rear edge of the panel 3 makes the support of the panel 3 very stable.

The slidable connection between the rear lever 16 of the first device 5 and the guiding slide 14 is accomplished by the engagement of the pivot pin 17 and a cam of the intermediate guide connection 19 with a rear guide curve 20. Rear guide curve 20 might be considered as two separate guide curves or slots, one for the pivot pin 17 and one for the intermediate guide connection 19 as the paths of movement thereof do not overlap. The guide curve 20 includes a lower front portion 20', a higher front portion 20", a high rear portion 20'" and a lower rear portion 20"". The pivot pin 17 slides only in the front portions 20' and 20", whereas the intermediate guide connection 19 moves in the rear portions 20'" and 20"".

The operation of the roof assembly 24 or open roof construction will be explained mainly with reference to FIGS. 5-7.

In FIG. 5, the panel 3 is shown in its closed position in which the panel 3 closes the opening 1 in the roof part 2. The panel 3 will be pulled forcedly by the operating mechanism with its seals in engagement with the roof part 2, so that no leakage of noise from the environment to the interior of the vehicle will occur. The seals (not shown) may either be fixed to the panel 3 or to the stationary roof part 2, or even to both. In this closed position both levers 7 and 16 of the rear and front devices 5,6 are in their lowest position. This is accomplished by their engagement with the guiding slide 14 which is in its front position in the guide rail 13. In this front position of the guiding slide 14, the pivot pin 8 of the lever 7 is positioned near the rear ends of the higher rear portion 15"" of the front guide curve 15, whereas intermediate guide connection 10 is positioned near the rear end of the lower front portion 15" of the curve 15. The guide member 11 of the lever 7 is positioned at the lower end of the front portion 12" of the stationary guide curve 12. This vertical front portion 12" of the stationary guide curve 12 provides a very stable lock against sliding movements of the panel 3 of the operating mechanism. The upper wall of the front guide curve 15 keeps the cam of the intermediate guide connection 10 down and due to the arrangement of this intermediate guide connection 10 near the pivotal connection 9, and due to the position of the pivotal connection 9 near the front edge of the panel 3 there is provided a very stable closed position of the panel 3 at least near the front edge.

The lever 16 is in its downward position due to the position of the intermediate guide connection 19 near the lower rear end of the rear portion 20"" of the rear guide curve 20, and the position of the pivot pin 17 in the higher front portion 20".

Also here, the intermediate guide connection 19 is positioned relatively close to the pivotal connection 18 to the panel 3, so that, if the intermediate guide connection 19 is kept in its lowest position the rear portion of the panel 3 can hardly move.

In the position of FIG. 6 the guiding slide 14 has been moved over a distance rearwardly while the panel 3 is kept substantially in its front position due to the engagement of the guide member 11 with the vertical front locking portion 12" of the stationary guide curve 12 preventing a sliding movement of the panel 3. However, the guide member 11 has been moved slightly upwardly in this vertical front portion 12" due to the movement of the pivot pin 8 through the higher rear portion 15"" and the movement of the intermediate guide connection 10 through the lower front portion 15" of the front guide curve 15.

The movement of the pivotal connection 18 of the rear lever 16 from the lower rear portion 20"" to the high rear portion 20"', the rear lever 16 has been pivoted upwardly so that the rear edge of the panel 3 has been moved to a position above the roof part 2, 2', so that a venting position is created.

FIG. 7 shows a further position of the panel 3, in which the front edge of the panel 3 has been lifted upwardly and the panel has been slid rearwardly over the adjacent roof part 2'. The sliding movement of the panel 3 has been made possible by the removal of the guide member 11 from the locking front portion 12" of the stationary guide curve. This has been accomplished by the upward tilting movement of the lever 7 due to the entry of the intermediate guide connection 10 into the vertical front locking portion 15' of the front guide curve 15 in the guiding slide 14. The levers 7 and 16 and therefore the panel 3 are now locked in sliding direction with respect to the guiding slide 14. The intermediate guide connection 10 is kept in its position in the front locking portion 15' due to the engagement of the guide member 11 with the rear portion 12' of the stationary guide curve 12 preventing a vertical movement of the lever 7. Thus, in the position of FIG. 7, the panel 3 and the operating mechanism move as a unit. The roof panel 2' rearwardly of the roof opening 1 is bordered at its longitudinal sides by a slot 21, so that the guiding slide 14 may be slid far rearwardly below the stationary roof part 2, whereas the panel 3 may move over this roof part 2, because the rear lever 16 or even also the front lever 7 may project through this slot 21 above the guide rail 13. Normally, the slot is closed by a sealing arrangement 22, but the sealing arrangement is deformable so that the lever(s) may move through the slot 21 by pushing the seals of the sealing arrangement 22 locally to the side. In this manner the operating mechanism connect the parts below the stationary roof part 2 to parts above the stationary roof part. This enables the operating mechanism to be moved far backwardly so as to create a large roof opening passage.

From the foregoing is will be clear that the invention provides a simple yet very stable operating mechanism for an open roof construction. Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An open roof construction for a vehicle having a roof opening defined in a roof part of the vehicle, comprising:
   at least a panel which is movable between a closed position in which it closes the roof opening and an open position in which it opens the roof opening and is positioned at least partially above an adjoining roof part,
   a guiding slide adapted to slide relative to the roof part,
   a first device adapted to move a rear edge of the panel towards a raised position relative to the closed position and above the adjoining roof part,
   a second device including a lever adapted to move a front edge of the panel in a vertical direction, said lever having a lower pivoting axis, an upper pivotal connection to the panel and an intermediate guide connection connecting the lever to the guiding slide, wherein the lever of the second device is arranged such that the intermediate guide connection is closer to the upper pivotal connection than to the lower pivoting axis, and
   a guide mechanism adapted to guide the panel towards the open position when the rear edge thereof is in the raised position, wherein the guide mechanism includes a stationary guide curve fixedly secured to the roof part, the stationary guide curve having a rear portion extending substantially parallel to the panel when the panel is in the closed position, and a front portion extending substantially perpendicularly to the rear portion;
   a guide member connected to the panel and slidably engaging the front portion and the rear portion of the stationary guide curve, wherein the guide member is arranged on the lever of the second device so as to be closer to the intermediate connection than to the upper pivotal connection.

2. The open roof construction according to claim 1, wherein the lever of the second device extends backwardly toward the rear edge of the panel and downwardly from the panel.

3. The open roof construction according to claim 1, wherein both the lower pivoting axis and the intermediate guide connection of the lever of the second device are in slidable engagement with the guiding slide, such that the lever of the second device is sliding with respect to the guiding slide when the guide member of the panel is positioned in the front portion of the stationary guide curve and is substantially locked with respect to the guiding slide when the guide member is positioned in the rear portion of the stationary guide curve.

4. The open roof construction according to claim 3, wherein the guiding slide includes a guide curve in engagement with the intermediate guide connection, the guide curve including a front locking portion extending substantially perpendicular to the rear portion of the stationary guide curve.

5. The open roof construction according to claim 1, wherein the first device includes a lever having a lower pivoting axis, an upper pivotal connection to the panel and an intermediate guide connection, connecting the lever to the guiding slide.

6. The open roof construction according to claim 5, wherein the intermediate guide connection of the first device is closer to the upper pivotal connection than to the lower pivoting axis of the lever.

7. The open roof construction according to claim 5, wherein the lever of the first device extends forwardly toward the front edge of the panel and downwardly from the panel.

8. The open roof construction according to claim 7, wherein movement of the panel from the open position to the closed position is movement in a first direction, wherein the guiding slide comprises a first guide curve co-operating with the lower pivoting axis of the lever of the first device and a second guide curve co-operating with the intermediate guide connection of the lever of the first device, the first guide curve extending forwardly and downwardly in the first direction, the second guide curve extending forwardly and upwardly in the first direction.

9. A roof assembly, comprising:
- at least a panel which is movable between a closed position in which it closes a roof opening in a vehicle and an open position in which it opens the roof opening, the open position of the panel being raised above and rearwardly displaced from the closed position,
- a guiding slide adapted to slide longitudinally upon a surface of the vehicle, the guiding slide including guiding portions adapted to guide the panel towards the open position,
- a first device adapted to move a rear edge of the panel in a vertical direction to a raised position relative to the closed position, and
- a second device including a lever adapted to move a front edge of the panel in a vertical direction, said lever having a lower pivoting axis, an upper pivotal connection to the panel and an intermediate guide connection connecting the lever to the guiding slide, wherein the lever of the second device is arranged such that the intermediate guide connection is closer to the upper pivotal connection than to the lower pivoting axis;
- a stationary guide curve adapted to be fixedly secured in a stationary position relative to the sliding guide, the stationary guide curve having a rear portion extending substantially parallel to the panel when the panel is in the closed position, and a front portion extending substantially perpendicularly to the rear portion;
- a guide member connected to the panel and slidably engaging the front portion and the rear portion of the stationary guide curve, wherein the guide member is arranged on the lever of the second device so as to be closer to the intermediate connection than to the upper pivotal connection.

10. The roof assembly according to claim 9, wherein the lever of the second device extends backwardly toward the rear edge of the panel and downwardly from the panel.

11. The roof assembly according to claim 9, wherein both the lower pivoting axis and the intermediate guide connection of the lever of the second device are in slidable engagement with the guiding slide, such that the lever of the second device is sliding with respect to the guiding slide when the guide member of the panel is positioned in the front portion of the stationary guide curve and is substantially locked with respect to the guiding slide when the guide member is positioned in the rear portion of the stationary guide curve.

12. The roof assembly according to claim 11, wherein the guiding portions of the slide comprise a guide curve in engagement with the intermediate guide connection, the guide curve including a front locking portion extending substantially perpendicular to the rear portion of the stationary guide curve.

13. The roof assembly according to claim 9, wherein the first device includes a lever having a lower pivoting axis, an upper pivotal connection to the panel and an intermediate guide connection, connecting the lever to the guiding slide.

14. The roof assembly according to claim 13, wherein the intermediate guide connection of the first device is closer to the upper pivotal connection than to the lower pivoting axis of the lever.

15. The roof assembly according to claim 13, wherein the lever of the first device extends forwardly toward the front edge of the panel and downwardly from the panel.

16. The roof assembly according to claim 15, wherein movement of the panel from the open position to the closed position is movement in a first direction, wherein the guiding portions of the guiding slide comprise a first guide curve co-operating with the lower pivoting axis of the lever of the first device and a second guide curve co-operating with the intermediate guide connection of the lever of the first device, the first guide curve extending forwardly and downwardly in the first direction, the second guide curve extending forwardly and upwardly in the first direction.

* * * * *